United States Patent [19]

Wilson

[11] Patent Number: 5,129,936
[45] Date of Patent: Jul. 14, 1992

[54] PROCESSES FOR THE PREPARATION OF ACID FORTIFIED PARAMAGNETIC IRON SULFATE SALT COMPOUNDS FOR USE IN THE TREATMENT OF AGRICULTURAL SOILS

[76] Inventor: Harold W. Wilson, P.O. Box 9851, El Paso, Tex. 79989

[21] Appl. No.: 559,353

[22] Filed: Jul. 30, 1990

[51] Int. Cl.$^5$ ............................................. C05D 9/00
[52] U.S. Cl. ................................. 71/63; 71/DIG. 2; 71/31; 423/558
[58] Field of Search .................. 71/61, 63, DIG. 2, 1, 71/31; 423/558, 146, DIG. 2; 75/961, 962

[56] References Cited

U.S. PATENT DOCUMENTS 3,359,091 12/1967 Clevenger ............................. 71/63
3,860,409 1/1975 Wilson ................................. 71/62
3,954,953 5/1976 Satterwhite et al. ............... 423/146

FOREIGN PATENT DOCUMENTS 2308467 9/1974 Fed. Rep. of Germany ...... 423/558
1286228 12/1986 Japan ................................. 423/558
459436 1/1937 United Kingdom ............... 423/558
531550 1/1941 United Kingdom ............... 423/558

OTHER PUBLICATIONS

Cameron et al, "Ferric Sulphates" pp. 641–650, 1907.
1957 USDA Yearbook of Agriculture, pp. 107 and 678.
USDA Agricultural Handbook No. 60, Issued Feb. 1954, pp. 48, 49, entitled "Diagnosis and Improvement of Saline and Alkali Soils".

*Primary Examiner*—Ferris Lander
*Attorney, Agent, or Firm*—Fleit, Jacobson, Cohn, Price, Holman & Stern

[57] ABSTRACT

The formation of paramagnetic iron sulfate hydrate salts containing iron in the di- and trivalent states from black magnetic iron oxides of high iron content and their use as fertilizers effective on both acid and alkaline soils is disclosed. Such oxides are comminuted, wetted with a specified amount of water, reacted with concentrated sulfuric acid, and dried. The resultant products are paramagnetic and contain iron in both the di- and trivalent states. These products have fertilizing and soil conditioning properties superior to non-magnetic iron compounds containing iron only in either the di- or trivalent state.

12 Claims, No Drawings

PROCESSES FOR THE PREPARATION OF ACID FORTIFIED PARAMAGNETIC IRON SULFATE SALT COMPOUNDS FOR USE IN THE TREATMENT OF AGRICULTURAL SOILS

BACKGROUND OF THE INVENTION

1. Field of the Invention

This invention relates to fertilizing materials for alkaline and acid soils and to a method of preparing and using such materials.

2. Description of Related Art

Highly acidic fertilizers for calcerous (alkaline) soils made from iron and copper refining slags are already well-known. However, there has been a continuing need to develop fertilizers, and processes for making same, which have increased equivalent acidity per unit weight and which will release their acidity to the soil over an extended period of time. In addition, there is a continuing need for fertilizers useful for application to both alkaline and acid soils.

U.S. Pat. No. 3,359,091 teaches the treatment of mine tailings containing substantial amounts of iron sulfides with 25% by weight of concentrated sulfuric acid followed by heating above 200° C. and hardening by treatment with ammonia.

U.S. Pat. No. 3,860,409 teaches the treatment of pulverized waste copper slag with concentrated sulfuric acid, addition of water, and allowing the product to stand until dry. The product is a dry granular gel composed of 80–85% of water soluble, partially hydrated, but mostly anhydrous, metallic sulfate salts in combination with metasilicic acid-absorbed sulfuric acid, approximately 15–20% of sulfuric acid insoluble iron and aluminum silicates, and approximately 1–2% of elemental sulfur.

The acidic fertilizers of the prior art are characterized by relatively low concentrations of reactive iron.

SUMMARY OF THE INVENTION

It is therefore an object of the present invention to provide a process for preparation of acidic fertilizer with a high iron content.

It is another object of the present invention to provide a process for preparation of acidic fertilizer containing both di- and trivalent iron.

It is another object of the present invention to provide a process for preparation of acidic fertilizer containing paramagnetic iron salts.

It is another object of the present invention to provide a process for preparation of acidic fertilizer containing a minimum of non-iron sulfate salts.

It is another object of the present invention to provide a process for preparation of acidic fertilizers having great variabilities in both soluble iron and titratable acidities thus permitting treatment of various types of soils.

It is another object of the present invention to provide a low energy requiring process for preparation of acidic fertilizers.

It is another object of the present invention to provide a process for fertilization of acidic or alkaline soils with an acidic fertilizer of superior properties.

It is another object of the present invention to provide a process for preparation of acidic fertilizers which provide large amounts of plant-available iron and sulfur to plants.

It is another object of the present invention to provide a process for preparation of acidic fertilizers which is inexpensive, efficient, safe, and without detrimental environmental effects.

This invention is concerned with the discovery that in the presence of controlled amounts of water, chemical treatment of black ferromagnetic iron oxides with concentrated sulfuric acid results in the immediate formation of solid state paramagnetic iron sulfate salt compounds which exhibit exceptionally strong paramagnetic properties. The resultant paramagnetic iron sulfate salt compounds not only display paramagnetic properties but also possess a wide variety of useful properties. They may contain minor to large amounts of chemically and physically combined sulfuric acid and are readily soluble when placed in contact with water. The paramagnetic iron sulfate and acid sulfate salt compounds contain minor to very large amounts of ferrous iron and ferric iron, hydrolyzable iron sulfate salts, and physically bound sulfuric acid. They are particularly well-suited for use in the beneficiation of all kinds and types of agricultural soils having wide variations in both soil acidity and soil alkalinity. They provide controllable additions of soluble plant-available iron and sulfur and aid directly and indirectly in effecting desirable changes in soil pH values.

The process of the instant invention permits the production of a number of compositions-of-matter containing variable amounts of soluble, insoluble, and unreacted magnetic iron; ferrous and ferric oxides of variable quantities; ferrosoferric oxides, paramagnetic ferrous and ferric iron sulfate hydrates, hemihydrates, and anhydrates; and, paramagnetic ferrosoferric acid sulfate salts containing physically combined sulfuric acid in combination with paramagnetic ferrous and ferric iron acid sulfate anhydrites. All of these named compositions-of-matter demonstrate either paramagnetic properties or combinations of ferromagnetism and paramagnetism.

DESCRIPTION OF THE PREFERRED EMBODIMENTS

This invention involves treatment of specified amounts of any one or of any mixture of the below-named magnetic black iron oxide compounds, all known to be able to demonstrate ferromagnetic properties and having particle sizes below 100 mesh U.S. Standard Sieve size while in the presence of specified amounts of water with specified amounts of concentrated sulfuric acid (93% to 98.5% $H_2SO_4$) added incrementally to the water-wetted magnetic black iron oxides. Chemical reactions took place which caused the formation of mixtures of various compositions of matter, all of which exhibited strong ferro- and paramagnetic properties. The various compositions of matter which can be made will range from substances containing small quantities of water soluble paramagnetic iron sulfate salts having no contents of free or uncombined sulfuric acid and having large quantities of unreacted ferromagnetic oxidic matter through a range of products having small, medium, large, to very large quantities of a variety of water soluble paramagnetic iron sulfate salts and small, medium, to large amounts of physically bound, hydrolyzable sulfuric acid with practically no measurable content of acid-unreacted ferromagnetic iron oxide compounds.

The following chemical equations illustrate the basic reactions that are believed to take place in the instant invention. One mol of ferromagnetic iron oxide ($Fe_3O_4$) in the presence of three mols of water ($3H_2O$) is admixed with four mols of sulfuric acid ($4H_2SO_4$) to form paramagnetic ferrosoferric sulfate heptahydrate as shown below in equation 1. When the product of equation 1 without the presence of additional water is treated with one additional mol of sulfuric acid, the heptahydrate salt of equation 1 is converted into paramagnetic ferrosoferric acid sulfate monohydrate salt as illustrated in equation 2. These equations illustrate one of the preferential embodiments of this invention.

Equation 1

$$Fe_3O_4 + 3H_2O + 4H_2SO_4 \rightarrow FeSO_4.Fe_2(SO_4)_3.7H_2O$$

Equation 2

$$FeSO_4.Fe_2(SO_4)_3.7H_2O + H_2SO_4 \xrightarrow{heat}$$
$$FeSO_4.Fe_2(SO_4)_3H_2SO_4.H_2O + 6H_2O$$

It is readily demonstrated that by varying the amounts of concentrated sulfuric acid admixed with the fixed amounts of magnetic iron oxides from fractions of molecular weights of sulfuric acid upwards to as much as five (5) molecular weights of sulfuric acid per molecular weight of magnetic iron oxide, partial to complete sulfuric acid hydrolytical decomposition of the ferromagnetic iron oxide will take place. Products formed contain variable amounts of paramagnetic di- and trivalent water soluble iron sulfate salt compounds where contents of combined and uncombined sulfuric acid can range from fractions of one percent sulfuric acid or its equivalent up to as much as eighty-one percent (81%). At the same time, the amounts of water soluble and water insoluble iron, water soluble sulfate sulfur, and combined sulfuric acid will vary with the ratio of reactants. The products of the instant invention contain paramagnetic iron sulfate salt compounds where the iron exits in both di- (+2) and tri- (+3) valent states.

The magnetic black iron oxides, both of natural and of artificial origin suitable for use in this invention are as follows: magnetic black ferrous oxide (FeO); natural magnetic ferrosoferric oxide ($FeFe_2O_4$); magnetic black iron oxide ($Fe_3O_4$); magnetite ores (60–70% by weight Fe content); magnetite ore admixed with ferric oxide (60–70% by weight Fe content); and artificial magnetite (reduced non-magnetic ores of ferric oxide to form magnetic ferrosoferric oxide ($FeOFe_2O_3$).

Table 1 shows the emission spectroscopy analysis of a sample of ferrosoferric black magnetic iron oxide representing the sampling of one lot of one hundred (100) tons of magnetic iron oxide. An extremely high concentration of iron was found. Practically no silica, no uncombined or free sulfur, and only approximately 9% total of a mixture of oxides of calcium, magnesium, manganese and vanadium were found. The magnetic black iron oxides are used as particles having a size which passes a 100 mesh U.S. Standard Sieve.

TABLE 1

| Analysis Of Ferrosoferric Black Magnetic Iron Oxide By Emission Spectroscopy | |
|---|---|
| Iron | 64.2% (equivalent to 88.7% $Fe_3O_4$) |
| Calcium | 1.5% |
| Magnesium | 3.2% |
| Silicon | 0.78% |
| Manganese | 0.69% |
| Aluminum | 0.48% |
| Vanadium | 0.002% |
| Copper | 0.093% |
| Zinc | 0.111% |
| Titanium | 0.0091% |
| Cobalt | 0.0086% |
| Chromium | 0.0019% |

Almost every element detected (as shown above) was determined to be present in the representative samples in the form of an oxide. Qualitative examinations of representative portions of the submitted sample showed no detectable amounts present of any of the following elements: boron, molybdenum, sulfur, nitrogen, fluorine, chlorine, phosphorous, carbon, mercury, and arsenic.

The sulfuric acids ($H_2SO_4$) suitable for use in this invention are as follows: 93 to 98.5% $H_2SO_4$ (known as concentrated, "virgin" or "pure" sulfuric acid previously unused and not contaminated with "foreign" matter); and 93 to 95% $H_2SO_4$ as found present in so-called "spent acid" (the waste or impure concentrated sulfuric acid obtained from use of virgin sulfuric acid in processing alkylation gasoline and petroleum products).

As a general rule, the amounts of water required to be present with the lots of magnetic iron oxides being treated should be equal to about one-half ($\frac{1}{2}$) of the volumes of concentrated sulfuric acid which are to be added to make each individual product desired except in cases of using concentrated sulfuric acid in amounts less than one (1) part by weight per each ten (10) parts by weight of the magnetic iron oxide being treated, and when using amounts of concentrated sulfuric acid greater than approximately 1.25 parts by weight of the acid per each one (1) part by weight of the magnetic iron oxide being treated. In these cases (extremes), smaller amounts of water should be used for the wetting of the oxide which amounts required should approximate one-fourth ($\frac{1}{4}$) to two-fifths (2/5) of the volumes of concentrated sulfuric acid to be used. In all cases of treating defined amounts of magnetic black iron oxides in the presence of defined amounts of water with incremental additions of defined amounts of concentrated sulfuric acid, temperatures in excess of 250°–300° F. (121°–149° C.), with a maximum of 350° F. (177° C.) should be reached during and after the addition of the concentrated sulfuric acid being used to result in maximum sulfuric acid hydrolysis of the magnetic iron oxides to cause formation of paramagnetic iron sulfate hydrate salts in a granular, semi- to dry, free flowing state where the majority of the water not essential to formation of hydrated magnetic iron sulfate salts has been driven off and mostly removed from the system by evaporation at the elevated temperatures achieved by the exothermic reactions taking place and where the noted acid iron sulfate salts hydrate products are being made to contain defined contents of total iron, water soluble iron, sulfuric acid equivalents, water soluble sulfate salt hydrates, and unreacted ferromagnetic iron oxides, all dependent upon the specific amounts of the ferromagnetic iron oxides, the amounts of water, and the amounts of concentrated sulfuric acid used to produce the resultant products.

The reaction of sulfuric acid with wetted iron oxides can take place at ambient temperatures or by exposure of all reactants combined to heat of sunlight. The reaction rate is accelerated by heating as described above.

Experimental studies have shown that all of the products of reaction between ferromagnetic black iron oxide compounds in the presence of specific amounts of water with concentrated sulfuric acid (93% to 98.5% $H_2SO_4$) exhibit possession of very strong demonstrable paramagnetic properties due to the presence of incomplete electron groups involving unpaired spins in their electrons, atoms, ions, and molecules. Paramagnetic iron salts such as double sulfates of iron, $FeSO_4.Fe_2(SO_4)_3$ (Ferrosoferric sulfate), as resulting from use of this invention, appear to be among the strongest of all paramagnetic iron salt compounds. The behavior of the electrons (of the noted iron sulfate salts) which constitute the elementary magnets of the spectroscopic state of the ions is directly related to the spin motion about their nuclei, thus defining this particular state of their magnetism known as paramagnetism.

The products obtainable from practice of the instant invention are in many ways completely different both chemically and physically when compared with so-called "conventional" iron sulfate salt products whether such products are naturally occurring, manufactured directly from reacting ordinary iron with sulfuric acid, or as by-product "wastes" resulting from use of certain metallurgical processes where various iron sulfate salts are produced from beneficiation of other metals. To illustrate principal differences noted from examinations of the following conventional iron sulfate products such as ferrous sulfate heptahydrate ($FeSO_4.7H_2O$) known under the common trade name "copperas", and as "Ironate", "Feosol", and "Irosul", and exsiccated ferrous sulfate dihydrate known as "Feromax", and the hexahydrate and nonahydrate of ferric sulfate—$Fe_2(SO_4)_3.9H_2O$ (known as the mineral, coquimbite) none of the named iron sulfate salts demonstrated any degree whatsoever of either ferro- or paramagnetism. Further studies of all of the above-named compounds shows none of them contained any amount of uncombined sulfuric acid, nor did any of them demonstrate abilities to contain variable amounts of sulfuric acid-replaceable waters of hydration as demonstrable by-products of the instant invention. Further examinations showed the water soluble iron contents expressed as % Fe of the conventional iron sulfate salts in the following ranges: copperas—20.09% Fe; Feromax—29.72% Fe; Coquimbite—19.83% Fe: bound water contents ranged from 17.58% for Feromax through 28.92% for coquimbite, to 45.36% for copperas: Hydrolyzable sulfuric acid contents ranged from 34.55% $H_2SO_4$ for copperas through 51.25% $H_2SO_4$ for coquimbite to 52.70% $H_2SO_4$ for Feromax. Products of the instant invention, in comparison, were made to contain the following: Water soluble iron content expressed as percent Fe ranges from 2.24% Fe to 29.70% Fe; bound water expressed as percent $H_2O$ ranges from 9.74% $H_2O$ to 41.62% $H_2O$; hydrolyzable sulfuric acid expressed as equivalent $H_2SO_4$ ranges from 3.88% $H_2SO_4$ to 62.44% $H_2SO_4$.

The products of this invention contain paramagnetic iron sulfate salt compounds where the iron exists in both di- ($+2$) and the tri- ($+3$) valent states. While conventional iron sulfate contains predominantly only either di- or trivalent non-magnetic iron compounds; also, none of the conventional iron sulfate compounds demonstrate either ferro- or paramagnetic properties. Thus, it is self-evident that direct comparisons of the chemical properties especially, but also the physical characteristics demonstrate wide differences between all of the products that can be derived from use of the instant invention and of the properties of the conventional products previously described.

The multitude of different products which can be derived from use of the instant invention can all be claimed to be useful, different, and highly superior for the most part to all presently known compounds of iron sulfate regardless of the valency state of their iron contents when employed in the treatment of all types of agricultural soils. It does not matter whether such soils are classified in nature as being acidic (pH less than 7.0) or as being alkaline (pH greater than 7.0). Conventional ferrous sulfate heptahydrate products (such as Cooperas and its like) being more readily dissolved in soils are also more readily reduced in soils to plant-unavailable forms of iron. In the cases of mixtures of the hydrous to the semi-hydrous to the anhydrous in the variety of possible products of the instant invention, experimental studies have shown that their contents of bi-valency iron ($Fe^{+2}$ and $Fe^{+3}$) being in general in a less soluble form and in the presence of sulfuric acid they tend to be protected from oxidation precipitation. Their inherent paramagnetic properties permit easy migration through soil profiles to form coatings of soluble paramagnetic iron on colloidal clays, silt, and sand particles of the soil. This results in much greater available iron contents of such soil particles thus favoring overall greater iron availability to plants growing in areas of soils that have been exposed to products derived from use of the instant invention. Further, in the cases of the so-called calcareous, alkaline soils which are less weathered and leached than soils formed with heavier rainfall, the acidulated dual valency iron sulfate salt compounds present in applied-to-the-soil products (prepared from use of the instant invention) seek out unaltered and uniformly distributed iron and iron compounds already present in soils. The hydrolyzable sulfuric acid of the applied compounds react with such iron compounds as well as react with alkaline compounds present to solubilize and neutralize them to permit a more increased level of soil beneficiation than could be possible from the singular use of the conventional iron sulfate compounds. Such conventional compounds, for the most part, are simply leached from the site of application (surface soil) by rainwater or irrigation water without ever developing or forming soil profiles or causing any great degree of soil beneficiation, as occurs with use of the mixture of valency (di- and trivalent) paramagnetic iron acid sulfate products described above in this disclosure of invention. Additionally, when major portions of the iron content of conventional products employed in soil treatments are present only as the trivalent ferric iron ($Fe^{+3}$) (as found present in agricultural ferric sulfate hexa- or nonanhydrates—$Fe_2(SO_3)_3.9H_2O$) such trivalent iron becomes quickly reduced to the ferrous (divalent, $Fe^{+3}$) state. This is followed by ready and quick dissolution followed by rapid transport of such ferrous iron to lower, less acidic horizons to become acid insoluble and plant-unavailable iron. Such iron is in various forms of highly insoluble iron oxides, hydrated iron oxides, and iron-organic matter complexes. In the case of the products of the instant invention, it has been discovered that because of the combination of their dual valencies (di- and trivalent iron contents) in the presence of sulfuric acid and soluble sulfate sulfur, there is a superior adaptation to overall conditions of constant changes in hydration and dehydration. In addition, the same type and degree of changes in oxidation-reduction states occurs as direct results of demonstration of the paramagnetic properties which also appear to be directly related to and affect charged soil particles to allow acceptance of and beneficial usage of common ions possessing electromagnetic properties. Also, the components of such products aid directly and indirectly in creating soil stability based upon their contents of readily acid hydrolyzable magnetic iron compounds in combination with soluble acid sulfate sulfur ions ($HSO_4^-$).

In general, the wide choices of products derivable from use of the instant invention not only demonstrate an extremely wide scope of application on all soils but such application makes possible achievements of degrees of soil beneficiation accompanied by enhanced plant growths that would be extremely difficult if not completely impossible to achieve with similar applications of either ferrous ($Fe^{+2}$) or of ferric ($Fe^{+3}$) conventional non-magnetic iron sulfate salt compounds alone with or without having contents of water of hydration.

EXAMPLES

Table 2 shows the results of the reaction of magnetic iron oxide with various amounts of water and sulfuric acid. In Example 1, 500 g naturally occurring magnetic ferrosoferric oxide ($FeFe_2O_4$) in a finely comminuted state (approximately 100% passed 100 mesh U.S. Standard Sieve) was placed in an acid resistant container. The oxide was wetted with 50 ml $H_2O$ with mixing. 100 ml concentrated sulfuric acid (98.5% $H_2SO_4$) was added in two equal increments with thorough mixing. After approximately ten (10) minutes standing the solid product was dried by exposure to heated air in the temperature range of 250°–300° F. (121°–177° C.). Although the products obtained from adding sulfuric acid to water-wetted magnetic iron oxide are essentially solid matter, they still contain some uncombined water and water of hydration. In order to eliminate all of the uncombined water and portions of the water of hydration (as may be desired), the products are heated to temperatures in the range of 300°–350° F. (149°–177° C.), preferentially while in a heated, rotating drum which permits granulation of the products at the same time as they are being dried. Example 2 was as in Example 1 except 75 ml water was used and 150 ml sulfuric acid was added in two equal increments. Example 3 was as in Example 1 except 100 ml water was used and 200 ml sulfuric acid was added in three equal increments. Example 4 was as in Example 1 except 125 ml water was used and 250 ml sulfuric acid was added in three increments. Example 5 was as in Example 1 except 150 ml water was used and 300 ml sulfuric acid was added in three increments. Example 6 was as in Example 1 except 175 ml water was used and 350 ml sulfuric acid was added in three increments. Example 7 was as in Example 1 except 200 ml water was used and 400 ml sulfuric acid was added in three increments. In every case, rapid and thorough combining of the water-wetted magnetic iron oxide with each incremental addition of the concentrated sulfuric acid assured optimum completeness of chemical reaction and the production of essentially the same or of different products as desired.

Table 2 shows that an increase in the amount of water and sulfuric acid used, while the amount of magnetic ferrosoferric oxide remained constant, resulted in increasing amounts of product. The composition of the product also varied with increasing amounts of water and sulfuric acid with a constant amount of oxide. The % equivalent sulfuric acid in the product increased from Example 1 to Example 7. The water soluble iron as % of total iron in the product increased from Example 1 to Example 7. In addition, from Example 1 to Example 7 there was an increase in the amounts of water soluble paramagnetic iron sulfate salts and an increase in total paramagnetism. From Example 1 to Example 7 there was a constant decrease in the total amounts of chemically unreacted magnetic iron oxides remaining after treatment. From Example 1 to Example 7 there was a constant increase in the amount of chemically bound, hydrolyzable sulfuric acid in the products. From Example 1 to Example 7 there was a constant decrease in the amounts of both free and combined water (water of hydration) in the products.

TABLE 2

| Example Number | Gms. $Fe_3O_4$ Used | Mls. $H_2O$ Used | Mls. $H_2SO_4$ 98.5% Used | Product in gms. | % Equiv. $H_2SO_4$ in Product | Water Sol. Iron as % Fe in Product |
|---|---|---|---|---|---|---|
| 1 | 500 | 50 | 100 | 645 | 28.25% | 14.09% |
| 2 | 500 | 75 | 150 | 710 | 38.51% | 15.84% |
| 3 | 500 | 100 | 200 | 784 | 46.43% | 17.54% |
| 4 | 500 | 125 | 250 | 883 | 51.53% | 19.22% |
| 5 | 500 | 150 | 300 | 967 | 56.65% | 20.98% |
| 6 | 500 | 175 | 350 | 1072 | 59.60% | 21.74% |
| 7 | 500 | 200 | 400 | 1180 | 61.77% | 23.16% |

In presenting representative embodiment, specific process steps have been described; however, modifications or substitutions can be made which fall within the scope of the invention. Therefore, in evaluating the scope of this invention, reference should be made to the appended claims.

What is claimed is:

1. A process for making paramagnetic iron sulfate soil fertilizing and soil improving products comprising the steps:
   mixing water with ferromagnetic iron oxides of at least 60% Fe content in a comminuted state,
   incrementally adding concentrated sulfuric acid to the mixture to control heating of the mixture of sulfuric acid and wetted ferromagnetic iron oxides to a temperature to form paramagnetic iron sulfate hydrate salt containing iron in the di- and trivalent states and allowing the reaction to proceed for a period of time sufficient for formation of said salt, and
   collecting the paramagnetic iron sulfate hydrate salt containing iron in the di- and trivalent states.

2. The process of claim 1 wherein the ferromagnetic iron oxide is selected from the group consisting of magnetic black ferrous oxide FeO, natural magnetic ferrosoferric oxide $FeFe_2O_4$, magnetic black iron oxide $Fe_3O_4$, magnetite ores of at least 60% by weight Fe content, magnetic ore of at least 60% by weight content admixed with ferric oxide of at least 60% by weight Fe content, and artificial magnetite consisting of magnetic ferrosoferric oxide $FeO \cdot Fe_2O_3$.

3. The process of claim 1 wherein the ferromagnetic iron oxide has a particle size below 100 mesh U.S. Standard Sieve size.

4. The process of claim 1 wherein the mixture is heated in the range of 250°-350° F. (121°-177° C.).

5. The process of claim 1 wherein the weight of concentrated sulfuric acid added ranges from 1 part by weight per 10 parts by weight of ferromagnetic iron oxide to 1.25 parts by weight per 1 part by weight of ferromagnetic iron oxide.

6. The process of claim 5 wherein the volume of water used is about ½ the volume of concentrated sulfuric acid added.

7. The process of claim 1 wherein the weight of concentrated sulfuric acid added ranges from 0.1-less than 1 part by weight per 10 parts by weight of ferromagnetic iron oxide or from greater than 1.25-10 parts by weight to 1 part by weight of ferromagnetic iron oxide.

8. The process of claim 7 wherein the volume of water used is about ¼ to 2/5 the volume of concentrated sulfuric acid added.

9. The process of claim 1 wherein the paramagnetic iron sulfate hydrate salt is paramagnetic ferrosoferric acid sulfate monohydrate.

10. The process of claim 1 wherein the paramagnetic iron sulfate hydrate salt has a water soluble iron content expressed as % Fe from 2.24% Fe to 29.70% Fe.

11. The process of claim 1 wherein the paramagnetic iron sulfate hydrate salt has a bound water content expressed as % $H_2O$ of 9.74% $H_2O$ to 41.62% $H_2O$.

12. The process of claim 1 wherein the paramagnetic iron sulfate hydrate salt has a hydrolyzable sulfuric acid content expressed as equivalent $H_2O$ of 3.88% $H_2SO_4$ to 62.44% $H_2SO_4$.

* * * * *